(12) United States Patent
Stewart

(10) Patent No.: US 7,434,465 B1
(45) Date of Patent: Oct. 14, 2008

(54) RING RESONATOR GYROSCOPE WITH CYLINDRICAL RING SUSPENSION

(75) Inventor: Robert E. Stewart, Woodland Hills, CA (US)

(73) Assignee: Litton Systems Inc., Woodland Hills, CA (US)

( * ) Notice: Subject to any disclaimer, the term of this patent is extended or adjusted under 35 U.S.C. 154(b) by 1 day.

(21) Appl. No.: 11/500,044

(22) Filed: Aug. 7, 2006

(51) Int. Cl.
*G01P 9/04* (2006.01)
(52) U.S. Cl. .................................. 73/504.13
(58) Field of Classification Search ............. 73/504.13, 73/504.12, 504.04
See application file for complete search history.

(56) References Cited

U.S. PATENT DOCUMENTS

| 4,499,778 | A | * | 2/1985 | Westhaver et al. | ............ 74/5 F |
| 4,644,793 | A | * | 2/1987 | Church | .................... 73/504.13 |
| 6,796,179 | B2 | * | 9/2004 | Bae et al. | ................. 73/504.12 |
| 6,978,674 | B2 | * | 12/2005 | Fell et al. | ................. 73/504.13 |
| 7,123,111 | B2 | * | 10/2006 | Brunson et al. | ......... 331/116 M |

* cited by examiner

*Primary Examiner*—Helen C. Kwok
(74) *Attorney, Agent, or Firm*—Patti, Hewitt & Arezina LLC

(57) ABSTRACT

A ring resonator gyro comprises a cylindrical ring suspension. The cylindrical ring suspension supports a cylindrical ring resonator. The cylindrical ring resonator is coupled with an outer perimeter of the ring suspension.

15 Claims, 2 Drawing Sheets

RING RESONATOR GYROSCOPE WITH CYLINDRICAL RING SUSPENSION

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties:

"OSCILLATION OF VIBRATING BEAM IN A FIRST DIRECTION FOR A FIRST TIME PERIOD AND A SECOND DIRECTION FOR A SECOND TIME PERIOD TO SENSE ANGULAR RATE OF THE VIBRATING BEAM," by Stewart, Application No. 60/549,709, filed Mar. 3, 2004.

"REAL TIME BIAS ESTIMATOR," by Lee, application Ser. No. 11/364,316, filed Feb. 28, 2006.

"COPLANAR PROOFMASSES EMPLOYABLE TO SENSE ACCELERATION ALONG THREE AXES," by application Ser. No. 11/010,588, filed Dec. 13, 2004.

"RING RESONATOR GYRO WITH FOLDED CYLINDER SUSPENSION," by Stewart, application Ser. No. 11/499,959, co-filed herewith.

BACKGROUND

An electromechanical system in one example measures a parameter. The electromechanical system may comprise a micro-electromechanical system ("MEMS") accelerometer or gyroscope that measures the parameter. For example, the accelerometer measures an acceleration and the gyroscope measures an angular rate (e.g., rotation). The gyroscope in one example comprises a vibrating ring with high Q degenerate fundamental modes of vibration. For example, high Q vibrating rings require little energy to sustain vibration. The vibrating ring in one example is employable for high performance closed loop angular rate sensing. The vibrating ring in another example is employable for lower performance open loop angular rate sensing. The mathematical model of the symmetrical vibrating ring is in many aspects similar to a vibrating ring or hemispherical resonator gyroscope ("HRG"). The analytical similarity to the hemispherical resonator gyroscope indicates that the vibrating ring gyroscope has the potential of achieving similar performance.

Drive components coupled with the vibrating ring cause a first oscillation of the vibrating ring. An angular rate of the vibrating ring and the first oscillation induce a Coriolis force on the vibrating ring. For example, the angular rate is about the longitudinal axis of the vibrating ring. The Coriolis force causes a second oscillation of the vibrating ring. The second oscillation is substantially perpendicular to the first oscillation. Feedback components in one example provide feedback on a magnitude of the first oscillation to the drive components for regulation of the first oscillation. Pickoff sensor components sense the second oscillations and apply control signals to null the pickoff signal. The control signals are a measure of the magnitude and polarity of the angular rate of the vibrating ring.

Small, low cost, low power navigation-grade inertial systems are needed to enable new applications such as personal navigation of individual soldiers and the guidance and control of air, ground and under water autonomous vehicles in GPS denied environments. Micro-electromechanical systems inertial systems are currently in development that promise to provide small, low cost, low power inertial systems for tactical grade applications such as guided munitions. Current tactical-grade MEMS inertial systems have gyro bias uncertainty in the range of 20-50 degrees per hour and angle random walk of 0.02 degrees per root hour. Future, small, low cost, low power navigation-grade inertial systems require lower gyro bias uncertainty and angle random walk.

Currently, a manufacturer of inertial sensors performs calibration of the inertial sensors with thermal modeling at a system level. The inertial system performance may be limited by one or more of: instability of the inertial sensors' bias and scale factor, non-repeatability of the thermal model, or hysteretic and thermal gradient induced errors that can not be modeled.

SUMMARY

The invention in one implementation encompasses a ring resonator gyro. The ring resonator gyro comprises a cylindrical ring suspension that supports a cylindrical ring resonator. The cylindrical ring resonator is coupled with an outer perimeter of the cylindrical ring suspension.

Another implementation of the invention encompasses a method. A cylindrical hole is etched through a first silicon wafer. A first oxide layer is grown on a surface of the first silicon wafer. A second silicon wafer is bonded underneath the first silicon wafer. The second silicon wafer patterned and etched through to the first oxide layer of the first silicon wafer to define a sealing ring, a plurality of drive/sense electrodes, and a cylindrical ring resonator. The second silicon wafer is etched through using the cylindrical hole as a mask. A third silicon wafer is bonded above the first silicon wafer. A native oxide from the second and third silicon wafers that is exposed in the cylindrical hole is removed. A layer of epi-poly silicon is deposited to form a cylindrical ring suspension. The first, second, and third silicon wafers are planarized to remove the epi-poly silicon from a surface of the third silicon wafer. The cylindrical ring resonator and side wall of the cylindrical ring suspension are released using an oxide etch. A fourth silicon wafer is bonded underneath the first silicon wafer. A plurality of feedthru vias are patterned and etched through the fourth silicon wafer to expose contact areas on the plurality of drive/sense electrodes. A plurality of metal electrodes are deposited to form ohmic contacts to the plurality of drive/sense electrodes through the feedthru vias.

DESCRIPTION OF THE DRAWINGS

Features of example implementations of the invention will become apparent from the description, the claims, and the accompanying drawings in which:

DETAILED DESCRIPTION

A navigation-grade inertial system in one example comprises relatively lower performance gyroscopes configured in a "self-calibrating" inertial system. In a further example, the inertial system is configured such that all of the inertial sensors lie in a single plane. This configuration does not require a sensor mounting block to orient the sensors to form an orthogonal three axis coordinate frame and does not require out-of-plane interconnections.

The self-calibration of the sensors in one example allows for an increase in accuracy of navigation grade inertial sensors by an order of magnitude without the use of a global positioning system (GPS). In a further example, the self-calibration of the sensors reduces gyro bias performance requirements of the sensors by two orders of magnitude for miniature, low power, low cost navigation-grade inertial systems.

To maintain the "self-calibrating" feature, a Z axis gyro in one example is a Class II Coriolis vibratory gyro, such as a vibrating ring gyro. The hemispheric resonator gyro (HRG) is an example of this class of gyro. Current HRGs, while demonstrating navigation-grade performance, do not satisfy the low cost requirement.

A low cost MEMS equivalent of the hemispheric resonator gyro (HRG) in one example may be operated in a self-calibrating mode and when integrated with a planar accelerometer and vibrating ring gyro in one example will form a very low cost, low power navigation-grade inertial system.

Figure 1:
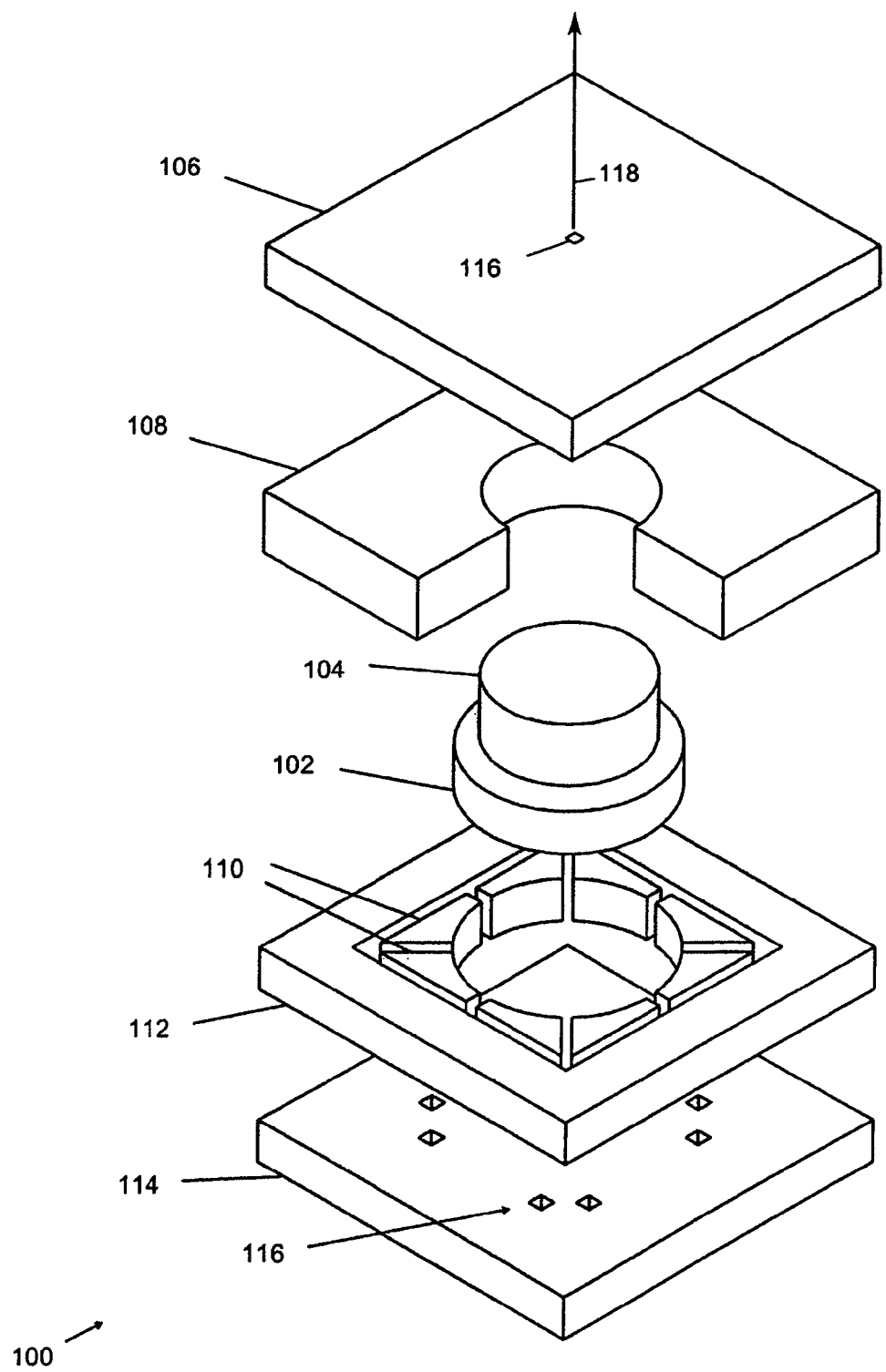
FIG. 1 is a representation of an exploded, perspective view of one implementation of an apparatus that comprises a ring resonator gyro.
Figure 2:
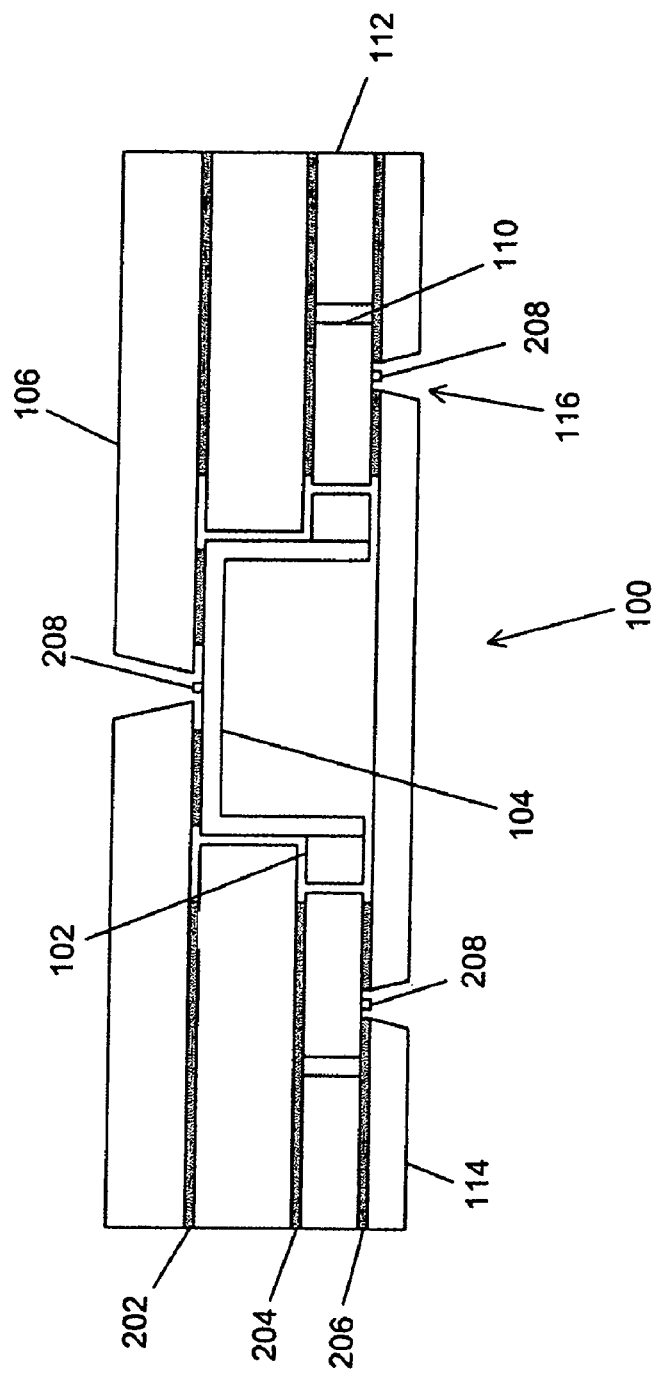
FIG. 2 is a representation of a side view of the ring resonator gyro of FIG. 1.

FIG. 1 is an exploded view of one implementation of a ring resonator gyro 100. The ring resonator 102 in one example comprises a cylindrical ring with a rectangular crossection. The ring resonator 102 is supported by a ring suspension 104, for example, a thin-walled cup or cylindrical ring suspension. The ring suspension 104 is attached mechanically to the top cover 106. The spacer 108 is bonded to the top cover 106 with an intervening dielectric layer 202 (dielectric layers are not shown FIG. 1). The spacer 108 surrounds the ring suspension 104 and is bonded to and supports the drive/sense electrodes 110 and sealing ring 112 with an intervening dielectric layer 204. The bottom cover 114 is bonded to the drive/sense electrodes 110 and sealing ring 112 with an intervening dielectric layer 206. Vias 116 are etched in bottom cover 114 and dielectric layer 206 to access the drive/sense electrodes 110. FIG. 2 is a crossection of the ring resonator gyro 100.

The ring resonator 102 in one example differs from other vibrating ring gyros concepts in one or more of: the design of the suspension, the high aspect ratio and high inertia of the ring, the options of interchanging the drive and sense modes of operation, and steering of the drive axis to coincide with the principal damping axis and/or control of the principal elastic axis to coincide with the drive axis.

In FIG. 2 the dielectric layers 202, 204, and 206 are shown extending inward from the outside edges of the device. The dielectric layers 202, 204, and 206 are etched away around the ring resonator 102 and ring suspension 104 to provide mechanical freedom for the ring resonator 102. The ring in one example is driven into resonance at its fundamental mode by two drive electrodes applying an electrostatic force at the resonant frequency at the plus antinodes of the vibration pattern. A drive pickoff signal is generated at the minus antinodes. The sense electrodes are at the plus nodes of the vibration pattern while the forcer electrodes are at the minus nodes. When an angular rate is applied, Coriolis forces couple vibration into the nodal points and generate a signal in the sense electrodes. A servo loop applies voltages to the forcer electrodes to null the displacement at the nodes of the vibration pattern. The forcer voltage is proportional to the angular rate applied about the axis 118 perpendicular to the plane of the ring resonator 102.

The following fabrication sequence describes example steps to fabricate a single ring resonator sensor chip. Multiple chips may be fabricated using silicon wafers. The number of chips will depend on the wafer diameter.

1. Using deep reaction etching such as the Bosch process etch a hole (for example, a 2 mm diameter hole) through a single crystal silicon wafer with a 111 crystal orientation. This, the spacer wafer, is designated wafer B. The silicon wafer in one example is 1 mm thick. The size of the hole and thickness of the wafer may be adjusted for different performance goals.
2. Grow 2 μm of $SiO_2$ on all surfaces of the spacer wafer.
3. Bond a 500 μm silicon wafer with a 111 crystal orientation to the spacer wafer. This, the ring resonator, drive/sense electrodes and sealing ring wafer, is designated wafer C.
4. Pattern and etch through wafer C to the oxide layer on wafer B to define the drive/sense electrodes 110 and sealing ring 112.
5. Using the oxided hole pattern in the spacer B as a mask, etch through wafer C.
6. Bond a 500 μm silicon wafer with a 111 crystal orientation to the opposite side of wafer A. This, the top cover wafer, is designated wafer A.
7. Remove the native oxide from wafer A and C that is exposed in the cavity formed by wafer B. Using an epitaxial silicon reactor, deposit 10 μm of epi-poly silicon to form the ring suspension 104.
8. Planarize the ABC wafer stack to remove the epi-poly silicon from the surface of the C wafer.
9. Release the ring resonator 102 and side wall of the ring suspension 104 using an oxide etch.
10. Bond a 500 μm silicon wafer with a 111 crystal orientation and a 2 μm oxide layer to the C wafer side of the ABC wafer stack. This, the bottom cover wafer, is designated wafer D.
11. Pattern and etch feedthru vias 116 through wafers A and D and the oxide layer to expose contact areas on the drive/sense electrodes 110.
12. Deposit aluminum metal electrodes using a shadow mask and anneal to form ohmic contacts 208 to the drive/sense electrodes 110.

The electronics to operate the ring resonator gyro 100 in one example are identical to that used to operate a hemispheric resonator gyro except for the changes necessary to accommodate the difference in resonant frequency and pickoff and forcer scaling.

What is claimed is:

1. A ring resonator gyro, comprising:
a cylindrical ring suspension that supports a cylindrical ring resonator;
wherein the cylindrical ring resonator is coupled with an outer perimeter of the cylindrical ring suspension.

2. The ring resonator gyro of claim 1, wherein the cylindrical ring suspension and cylindrical ring resonator form a micro-electromechanical system (MEMS).

3. The ring resonator gyro of claim 1, further comprising:
a top cover;
a spacer coupled with the top cover and located underneath the top cover, wherein the spacer comprises a cylindrical hole that is normal to a plane of the spacer;
a plurality of electrodes located underneath the spacer;
a sealing ring located underneath the spacer and around an outer perimeter of the plurality of electrodes;
a bottom cover coupled with the plurality of electrodes and the sealing ring;
wherein the cylindrical ring suspension is located within the cylindrical hole;
wherein the cylindrical ring resonator is located underneath the spacer;
wherein the plurality of electrodes are located around an outer perimeter of the cylindrical ring resonator.

4. The ring resonator gyro of claim 3, wherein the cylindrical ring suspension is formed from a ten micrometer deposit of epi-poly silicon.

5. The ring resonator gyro of claim 3, wherein the cylindrical ring suspension is mechanically attached to the top cover.

6. The ring resonator gyro of claim 3, wherein the cylindrical ring resonator comprises a rectangular cross section.

7. The ring resonator gyro of claim 3, wherein the spacer is bonded to the top cover with an intervening first dielectric layer.

8. The ring resonator gyro of claim 7, wherein the spacer is bonded to the plurality of electrodes and the sealing ring with an intervening second dielectric layer.

9. The ring resonator gyro of claim 8, wherein the bottom cover is bonded to the plurality of electrodes and the sealing ring with an intervening third dielectric layer.

10. The ring resonator gyro of claim 9, wherein the bottom cover and the intervening third dielectric layer comprise a plurality of vias for electrical contact with the plurality of electrodes.

11. The ring resonator gyro of claim 9, wherein the first, second, and third dielectric layers are etched away around the cylindrical ring resonator and the cylindrical ring suspension to provide mechanical freedom for the cylindrical ring resonator.

12. The ring resonator gyro of claim 3, wherein the plurality of electrodes comprise one or more drive electrodes;
   wherein the one or more drive electrodes apply an electrostatic force to the cylindrical ring resonator at a resonant frequency;
   wherein the one or more drive electrodes apply the electrostatic force to the cylindrical ring resonator at plus antinodes of a vibration pattern of the cylindrical ring resonator to drive the ring resonator into resonance at a fundamental mode.

13. The ring resonator gyro of claim 12, wherein the plurality of electrodes comprise one or more sense electrodes and one or more forcer electrodes;
   wherein the one or more sense electrodes are located at plus nodes of the vibration pattern of the cylindrical ring resonator;
   wherein the one or more sense electrodes sense a Coriolis force vibration in nodal points of the cylindrical ring resonator;
   wherein the one or more forcer electrodes are located at minus nodes of the vibration pattern of the cylindrical ring resonator,
   wherein the one or more forcer electrodes receive from a servo loop a voltage that is proportional to an angular rate applied about an input axis that is coaxial with the cylindrical ring resonator;
   wherein the one or more forcer electrodes employ the voltage to null displacement at one or more nodes of the vibration pattern.

14. The apparatus of claim 3, wherein a first silicon wafer comprises the top cover;
   wherein a second silicon wafer comprises the spacer;
   where in a third silicon wafer comprises the ring resonator, the plurality of electrodes, and the sealing ring;
   wherein a fourth silicon wafer comprises the bottom cover;
   wherein the first, second, third, and fourth silicon wafers comprise silicon wafers with a "111" crystal orientation.

15. The ring resonator gyro of claim 1, wherein a face of the cylindrical ring resonator abuts a face of the cylindrical ring suspension.

* * * * *